United States Patent
Climen et al.

(10) Patent No.: US 10,915,805 B2
(45) Date of Patent: Feb. 9, 2021

(54) METHOD FOR RECORDING A REFERENCE BIOMETRIC DATA ITEM IN A BIOMETRIC SMART CARD

(71) Applicant: IDEMIA France, Courbevoie (FR)

(72) Inventors: Bruno Climen, Courbevoie (FR); Benoît Mouroux, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 16/514,203

(22) Filed: Jul. 17, 2019

(65) Prior Publication Data

US 2020/0026975 A1 Jan. 23, 2020

(30) Foreign Application Priority Data

Jul. 18, 2018 (FR) ..................................... 18 56665

(51) Int. Cl.
*G06K 19/073* (2006.01)

(52) U.S. Cl.
CPC .............................. *G06K 19/07354* (2013.01)

(58) Field of Classification Search
CPC .............................................. G06K 19/07354
USPC ......................................................... 235/451
See application file for complete search history.

(56) References Cited

U.S. PATENT DOCUMENTS

| | | | | |
|---|---|---|---|---|
| 9,135,787 B1 * | 9/2015 | Russell | ................ | G07F 19/201 |
| 10,489,785 B1 * | 11/2019 | Burks | .................... | G06Q 20/04 |
| 2006/0000892 A1 * | 1/2006 | Bonalle | ............ | G06Q 20/40145 |
| | | | | 235/380 |
| 2008/0222049 A1 * | 9/2008 | Loomis | ................. | G07F 7/1091 |
| | | | | 705/75 |
| 2009/0292641 A1 * | 11/2009 | Weiss | .................. | G06F 21/6245 |
| | | | | 705/66 |
| 2014/0002238 A1 * | 1/2014 | Taveau | .................... | G07C 9/257 |
| | | | | 340/5.53 |
| 2014/0365782 A1 * | 12/2014 | Beatson | .................. | G06F 21/32 |
| | | | | 713/186 |
| 2015/0073998 A1 | 3/2015 | Alsina et al. | | |
| 2016/0371686 A1 * | 12/2016 | Metral | ................. | G06Q 20/206 |
| 2017/0300680 A1 | 10/2017 | Wendling | | |
| 2017/0366351 A1 | 12/2017 | Khullar et al. | | |

FOREIGN PATENT DOCUMENTS

| | | |
|---|---|---|
| WO | 2016/055661 A1 | 4/2016 |
| WO | 2018/234221 A1 | 12/2018 |

OTHER PUBLICATIONS

FR Search Report, dated Apr. 9, 2019, from corresponding FR application No. 1856665.

* cited by examiner

*Primary Examiner* — Michael G Lee
*Assistant Examiner* — David Tardif
(74) *Attorney, Agent, or Firm* — Nixon & Vanderhye

(57) ABSTRACT

Disclosed is a method for recording a reference biometric data item in a biometric smart card including a biometric sensor. The recording of a biometric data item acquired by the biometric sensor, as a reference biometric data item, is completed in response to the validation, by the biometric smart card, of a personal secret code of the biometric smart card user entered on a first external device to authorise a transaction between the biometric smart card and a second external device by way of the first external device.

15 Claims, 3 Drawing Sheets

METHOD FOR RECORDING A REFERENCE BIOMETRIC DATA ITEM IN A BIOMETRIC SMART CARD

FIELD OF THE INVENTION

The invention is in the field of biometric smart cards, for example, bank cards or electronic access badges fitted with a biometric sensor. It particularly relates to a method for recording a reference biometric data item in a biometric smart card comprising a biometric sensor, as well as to such a biometric smart card.

CONTEXT OF THE INVENTION

When a user is issued with a biometric smart card, for example, a bank card with a fingerprint sensor, or even a badge for accessing a secure zone, it needs to be configured with his/her personal data, for example, his/her fingerprint.

To this end, he/she generally has to visit a specific institution, for example, the bank, or even be provided with an electronic device capable of communicating with the biometric smart card and having an application that is specifically designed to securely record his/her biometric data.

All of this is therefore very inconvenient for the user, particularly when he/she wishes to use his/her biometric smart card immediately to complete a financial transaction or to access a secure zone.

There exists a need for recording, without any inconvenience and in a secure manner, a reference biometric data item on a biometric smart card.

SUMMARY OF THE INVENTION

Thus, the aim of the present invention is to overcome at least one of these disadvantages.

In this context, a first aspect of the invention relates to a method for recording a reference biometric data item in a biometric smart card comprising a biometric sensor, characterised in that the recording of a biometric data item acquired by the biometric sensor, as a reference biometric data item, is completed in response to the validation, by the biometric smart card, of a personal secret code of the biometric smart card user entered on a first external device to authorise a transaction between the biometric smart card and a second external device by means of the first external device.

Correlatively, a second aspect of the invention relates to a biometric smart card comprising:
  a biometric sensor configured to acquire a biometric data item of a user of the biometric smart card;
  a memory configured to store said acquired biometric data item;
  a microcontroller configured to store said acquired biometric data item; and
  an interface for communicating with a first external device;
the biometric smart card being characterised in that recording the biometric data item acquired by the biometric sensor in the memory of the biometric smart card as a reference biometric data item is dependent on the validation, by the biometric smart card, of a personal secret code of the biometric smart card user entered on the first external device to authorise a transaction between the biometric smart card and a second external device by means of the first external device.

The invention that is thus claimed allows a user to configure his/her biometric smart card by recording a reference biometric data item based on a conventional transaction protected by a personal secret code with a conventional external device.

It avoids a tedious configuration that forces the user to visit the card supplier (for example, the bank in the case of a biometric bank card) or to connect to an ad hoc device, whilst maintaining security with respect to the recording of a new reference biometric feature.

Other features of the method and of the biometric smart card according to embodiments of the invention are described in the dependent claims.

In embodiments, the method may particularly comprise the following steps:
  acquiring, by the biometric sensor, a biometric data item of a user of the biometric smart card; and
  recording said biometric data item in the biometric smart card as a reference biometric data item, this recording being completed at the time of the transaction with the second external device and being dependent on the validation of the personal secret code of the user entered to validate the transaction.

The first external device is, for example, a payment terminal (smart card reader or even a smart phone) of a sales point. By way of a variant, the first external device is an identification unit or a badge reader for an access badge.

For example, the transaction is a bank transaction and the biometric smart card is a bank card, for example, compliant with the EMV standard. By way of a variant, the transaction is an access control, for example, for accessing a building, and the biometric smart card is an access badge.

It is to be noted that the biometric sensor is not necessarily controlled by a secure element. For example, it may be controlled by an additional microcontroller present on the biometric smart card, optionally at the request of the secure element of the smart card. For example, the additional microcontroller can autonomously control the sensor in the event that biometric data is acquired when the biometric smart card is powered-on.

In a particular embodiment of the invention, the acquisition of the biometric data item by the biometric sensor is completed when the biometric smart card is powered-on (for example, the powering-on preceding the transaction or another powering-on operation) or when the transaction is initiated or in response to the validation of the personal secret code by the smart card.

In a particular embodiment of the invention, the personal secret code is a PIN code. By way of a variant, the personal secret code is a password or a pattern of the type for unlocking a touchscreen.

In a particular embodiment of the invention, the method further comprises a step of sending, to the first external device, a command to display an indication relating to the recording of the biometric data item.

This command may be an APDU command compliant with standard ISO 7816.

For example, the indication indicates that the biometric data item has been recorded as a reference biometric data item. It may also provide information relating to the sequence of operations for the acquisition of the biometric data by the biometric sensor or may even stipulate the finger that must be presented to the sensor.

In a particular embodiment of the invention, the method further comprises a step of modifying a secure transaction mechanism so that the reference biometric data item is used instead of the personal secret code to authorise a future transaction.

In a particular embodiment of the invention, a plurality of reference biometric data items is recorded in the biometric smart card, the step of modifying the secure mechanism being completed when the number of recorded reference biometric data items exceeds a predetermined threshold.

This modification allows, for example, the reference biometric data item to be used instead of the personal secret code to authorise a future transaction.

In a particular embodiment of the invention, the modification of the secure mechanism is cancelled upon the detection of a predetermined event or in a random manner, so that the personal secret code is again used to authorise a transaction. Thus, the mode for validating the transaction may return to the default mode.

This allows a better level of security to be maintained. This also allows additional biometric data items or recent biometric data items to be recorded as reference biometric data items.

According to embodiments, this return to the default validation mechanism may occur regularly, for example, when a predetermined number of transactions has been completed with the card.

Thus, in a particular embodiment of the invention, the predetermined event involves reaching a predefined maximum number of transactions completed by the biometric smart card.

By way of a variant, this return to the default mode may occur in a random manner.

In a particular embodiment of the invention, recording the biometric data item as a reference biometric data item includes associating validity information with the reference biometric data item, the predetermined event being the determination of the invalidity of the reference biometric data item as a function of the associated validity information.

To this end, the method may comprise a step of verifying the validity information prior to any use in order to validate a transaction so as to determine whether or not the associated reference biometric data item is valid.

In a particular embodiment of the invention, the validity information defines a validity duration of the reference biometric data item, an expiry date of the reference biometric data item or a maximum number of uses of the reference biometric data item for validating a transaction. Thus, when it is determined that a reference biometric data item is no longer valid according to validity information that was associated therewith when it was recorded, the secure mechanism returns to the default validation mode, i.e. based on a personal secret code.

In a particular embodiment of the invention, the first external device is the second external device.

In a particular embodiment of the invention, the communication interface is a contact communication interface compliant with standard ISO 7816 or a contactless communication interface compliant with standard ISO 14443 and/or ISO 15693.

In a particular embodiment of the invention, the biometric data item characterises a fingerprint, an iris, a face or an electrocardiogram.

By way of an illustration, the biometric data may include a photo of the iris, of the fingerprint or of the face, and/or encoding of the patterns thereof. It may provide information, for example, on the shape of the face, the relative position of notable points of the face, such as the end of the nose, the ears or the mouth.

The advantages, aims and particular features of the biometric smart card are similar to those of the aforementioned method.

In a particular embodiment, the various steps of the aforementioned method are determined by computer program instructions.

Consequently, the invention also relates to a computer program on a data medium, said program being able to be implemented by a microprocessor, said program comprising instructions adapted to implement steps of the method as mentioned above.

This program may use any programming language and may be in the form of source code, object code or of intermediate code between source code and object code, such as in a partially compiled format, or in any other desirable format.

The invention also relates to a data medium that may be read by a microprocessor and comprises instructions of a computer program as mentioned above.

The data medium may be any entity or device capable of storing the program. For example, the medium may comprise a storage means, such as a ROM, for example, a microcircuit ROM, or even a magnetic recording means, for example, a hard disk or even a flash memory.

Furthermore, the data medium may be a communicable medium, such as an electrical or optical signal, which may be routed via an electrical or optical cable, by radio or by other means. The program according to the invention particularly may be downloaded onto a storage platform of an Internet type network.

Alternatively, the data medium may be an integrated circuit, in which the program is incorporated, the circuit being adapted to execute or to be used to execute the method in question.

The aforementioned data medium and computer program have features and advantages similar to the method that they implement.

BRIEF DESCRIPTION OF THE FIGURES

Further features and advantages of the invention will become more apparent throughout the following description, which is illustrated using the accompanying figures, which show embodiments devoid of any limiting character, and in which.

DETAILED DESCRIPTION OF THE INVENTION

Figure 1:
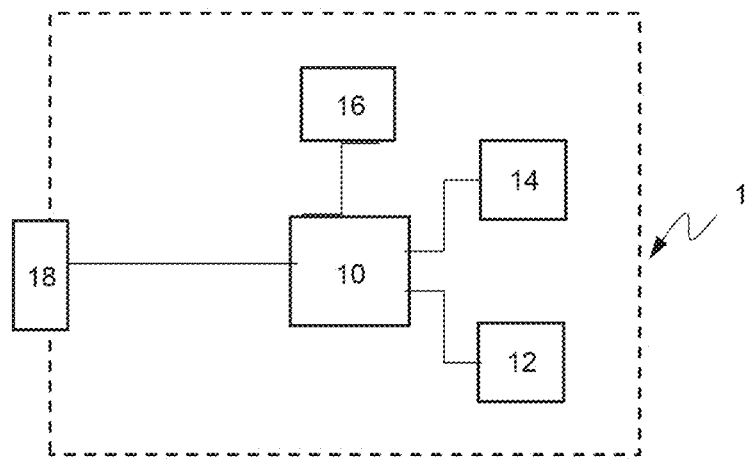
FIG. 1 shows an example of the architecture for a device according to embodiments of the invention.

FIG. 1 schematically shows an example of the possible architecture for a biometric smart card 1 according to embodiments of the invention.

The biometric smart card 1 is a bank card, for example. In embodiments, it is a bank card compliant with the EMV (Europay Mastercard Visa) standard, which since 1995 is the international security standard for payment cards (smart cards). By way of a variant, the biometric smart card 1 is a badge for accessing a secure zone of a building.

This biometric smart card 1 comprises a processing unit 10 (or microprocessor) connected by a bus to a random access (or volatile) memory 12, a non-volatile memory 14, a biometric sensor 16 and a communication interface 18.

The random access memory 12 is, for example, a RAM (Random Access Memory) comprising registers adapted to record variables and parameters created and modified when executing a computer program comprising instructions for implementing a method according to embodiments of the invention, when implementing the invention. The instruction codes of the program stored in the non-volatile memory 14 are loaded into the RAM memory with a view to being executed by the processing unit 10.

The non-volatile memory 14 is, for example, a ROM (Read Only Memory) or an EEPROM (Electrically Erasable Read Only Memory) or even a flash memory and may form a medium according to the invention, i.e. it may include a computer program comprising instructions for implementing a method according to embodiments of the invention.

The biometric sensor 16 is, for example, a fingerprint sensor, an iris or face scanner or even a heart rate sensor. The communication interface 18 allows the biometric smart card 1 to communicate with an external device. The external device is, for example, a payment terminal (smart card reader or even a smart phone) of a sales point. By way of a variant, the external device is an identification unit or a badge reader for an access badge.

According to embodiments, the communication interface 18 is compliant with standard ISO 7816 (contact communication) or with standards ISO 14443 or NFC/ISO 15693 (contactless communication).

In embodiments, the biometric smart card may comprise one or more LEDs, which are coloured, for example, in order to assist the user when a biometric data item is acquired by the biometric sensor.

Figure 2:
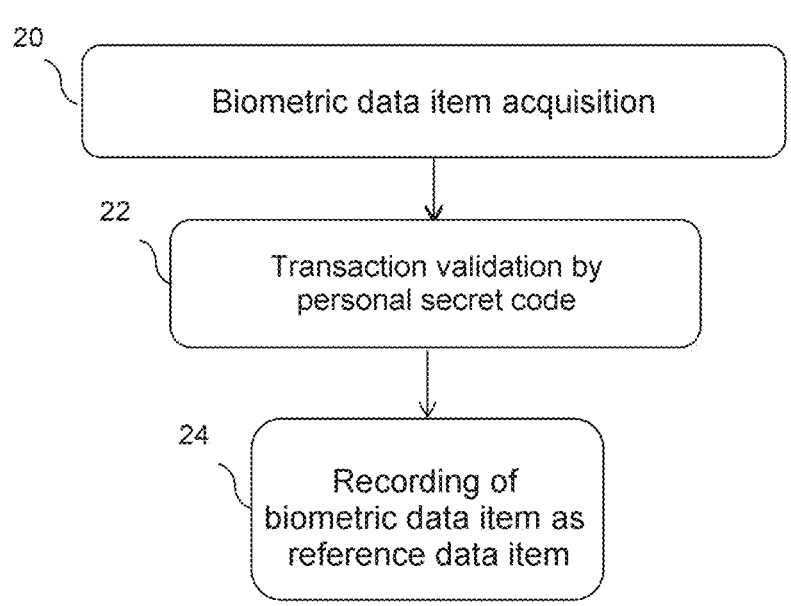
FIG. 2 shows, in the form of a flow chart, general steps of a recording method according to embodiments of the invention.

FIG. 2 shows, in the form of a flow chart, general steps of a recording method 2 according to embodiments of the invention. This method is, for example, implemented by the elements of the biometric smart card 1 of FIG. 1.

During a first step 20, the biometric sensor 16 of the biometric smart card 1 acquires a biometric data item of a user. For example, if the biometric sensor 16 is a fingerprint sensor, the biometric data item characterises a fingerprint of the user. Depending on the type of biometric sensor 16, the biometric data item may, by way of a variant, characterise the iris, the face or even the electrocardiogram of the user. Thus, for example, the biometric data item may be a photo of the iris or of the face of the user, an encoding of the patterns of the iris or of the features of the face (for example: shape, relative position of notable points of the face, such as the end of the nose, the ears, the mouth).

During a second step 22, the biometric smart card 1 verifies a personal secret code of the user that it receives from a first external device. This personal secret code is, for example, a PIN code, a password or a pattern of the type for unlocking a touchscreen. It has been previously entered by the user on the first external device to authorise a transaction between the biometric smart card and a second external device.

By way of an illustration, the transaction may be a bank transaction or an access control, for example, for accessing a building.

Thus, the first external device is, for example, a payment terminal (smart card reader or even a smart phone) of a sales point or an identification unit or a badge reader for an access badge. The second external device is, for example, a transaction server. By way of a variant, the first external device and the second external device are the one and the same device.

During this step 22, the personal secret code of the user is therefore verified, then validated by the biometric smart card 1 when it is correct. The result of the verification may then be transmitted to the first external device in order to notify said device and/or to notify the second device that the transaction may occur.

Subsequently, during a step 24, the biometric data acquired in step 20 is recorded in the biometric smart card 1 as a reference biometric data item if the personal secret code received in step 22 to authorise a transaction is validated. Advantageously, the described method allows the user to configure his/her biometric smart card by recording a reference biometric data item based on a conventional transaction protected by a personal secret code with a conventional external device. It avoids a tedious configuration that forces the user to visit the card supplier (for example, the bank in the case of a biometric bank card) or to connect to an ad hoc device, whilst maintaining security with respect to the recording of a new reference biometric feature.

Examples of the implementation of this general method will now be described with reference to FIGS. 3 and 4.

Figure 3:
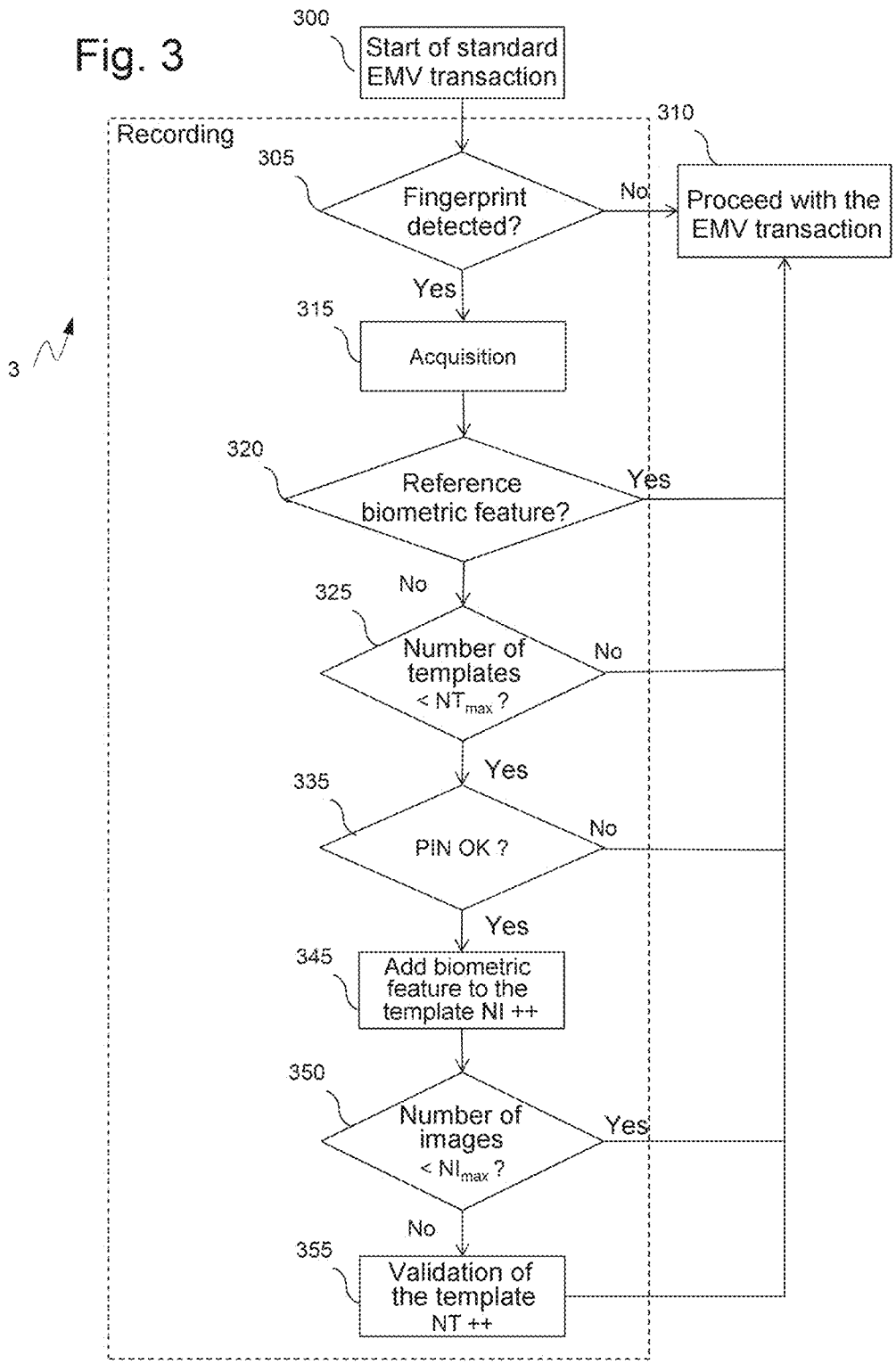
FIG. 3 shows, in the form of a flow chart, steps of a recording method according to a first embodiment of the invention.

FIG. 3 shows, in the form of a flow chart, steps of a recording method 3 according to a first embodiment of the invention.

According to this first embodiment, a plurality of reference biometric data items may be recorded, for example, in the form of a template, with a template being able to include a predetermined number of reference biometric data items. The biometric smart card 1 may then include a plurality of templates.

In this example, the transaction is an EMV type bank transaction, the biometric smart card 1 is a bank card, the biometric sensor is a fingerprint sensor and the biometric data item therefore characterises a fingerprint. However, the embodiments of the invention are not limited to this example and, as has been described with reference to FIG. 2, the transaction, the biometric smart card, the biometric sensor and the biometric data may be of another type.

Thus, in this example, a template may include several images of the same fingerprint (same finger). The various templates may correspond to several different fingerprints (i.e. several different fingers). This is not limiting. There could be one image per template and several templates then could correspond to the same fingerprint (to the same finger).

A first step 300 corresponds to the beginning of a standard EMV transaction with an external device (payment terminal, for example).

During a step 305, the biometric smart card 1 determines whether a fingerprint is detected by the fingerprint sensor. If this is not the case, the EMV transaction proceeds in a conventional manner (step 310).

If, however, a fingerprint is detected in step 305, the fingerprint sensor acquires information relating to this fingerprint (step 315). For example, the fingerprint sensor takes a photo or an image of the fingerprint or analyses this fingerprint in order to extract the patterns therefrom. Thus, in this example, the biometric data item is acquired when the biometric sensor detects the presence of the finger. By way of a variant, the biometric data item could be acquired upon initiation of the transaction (step 300), or in response to the validation of the personal secret code by the smart card (positive test 335) or at another time in the method, for example, once it is certain that the biometric data item may be recorded in view of the maximum number of templates NTmax or of biometric data NImax that is authorised. In other embodiments, the biometric data could be acquired independently of the transaction, for example, upon powering-on of the biometric smart card.

In step 320, the biometric smart card 1 determines whether the biometric feature acquired in step 315 corresponds to a reference biometric data item already recorded in the card.

If so, the transaction proceeds in a conventional manner (step 310).

Otherwise, it may involve a new biometric data item being recorded as a reference biometric data item. Step 325 involves determining whether the number of templates recorded in the card is less than the predetermined maximum NTmax. If this is not the case, this means that this maximum has already been reached and that the acquired data item may not be recorded as a new reference biometric data item, the method then proceeds to step 310.

If the maximum number of templates has not yet been reached, the method proceeds with the testing of a PIN code (step 335) entered by the user on the external device to authorise the EMV transaction. The invention is not limited to the PIN codes as mentioned above.

If the PIN code is incorrect, the method proceeds with step 310. In this case (incorrect PIN), the acquired biometric data item is not recorded.

A PIN code attempts counter may be incremented so that the card is blocked (i.e. may no longer be used) if a maximum number of attempts is reached.

If the PIN code is correct, the biometric data item acquired in step 315 is disposed in a template in step 345 so that the biometric data item is recorded in the card as a reference biometric data item. A biometric data counter NI of the template is incremented. If this number reaches the maximum number NImax of biometric data items authorised in the template (test 350), the template is validated in step 355. The number of templates NT of the card is incremented. However, if the number NI of biometric data items of the template has not reached the maximum NImax in step 350, the transaction proceeds normally to step 310 without validation of the template. The template may still be used to record a subsequent reference biometric data item that will be added to the recordings of reference biometric data items already completed in said template.

The verification of the PIN code (the same PIN code as that verified in step 335 for recording the biometric data item) for authorising the EMV transaction is processed independently in step 300 and/or 310 of the transaction. Alternatively, the verification of the PIN code for authorising recording of the acquired biometric data item (step 335) could also be used to directly authorise the transaction.

Thus, the PIN code entered by the user on the external device may be verified one or more times during one or more steps.

The biometric data item is recorded irrespective of the continuation of the transaction (step 310).

Step 310 comprises, for example, the generation of a cryptogram that may allow the transaction to be validated with the biometric data item or the PIN code.

Indeed, in embodiments, a step of modifying a secure transaction mechanism is provided. This modification allows, for example, the reference biometric data item to be used instead of the personal secret code to authorise a future transaction.

In embodiments, this modification of the secure mechanism is completed automatically when the number of recorded reference biometric data items (or of templates) exceeds the authorised maximum NImax (or NTmax).

However, in order to maintain a satisfactory security level, and/or to allow additional biometric data items or recent biometric data items to be recorded as reference biometric data items, the mode for validating the transaction may return to the default mode, i.e. based on the personal secret code of the user.

For example, this return to the default validation mechanism may occur regularly, for example, when a predetermined number of transactions has been completed with the card.

By way of a variant, this return to the default mode may occur in a random manner.

According to another variant, this return to the default mode may occur when it is determined that a reference biometric data item is no longer valid according to validity information that was associated therewith when it was recorded. This validity information is, for example, a validity duration of the reference biometric data item, an expiry date of the reference biometric data item or a maximum number of uses of the reference biometric data item for validating a transaction.

The block marked "Recording" comprises steps that depend on the validation mode, i.e. on the secure mechanism, the ongoing transaction and therefore on specific features of the transaction and/or on features specific to the biometric smart card.

In this example, the steps of the block marked "Recording" are only executed if the transaction uses a PIN code for its validation.

It is to be noted that the biometric smart card may indicate, during step 300, on the terminal and/or on the transaction server, the secure mechanism to be used to validate the transaction. To this end, the biometric smart card may include this indication in a response to a command that it has previously received from the terminal. For example, in the case of an EMV type bank transaction, the biometric smart card uses the response to the command called GPO (Get Processing Option) previously received from the terminal.

The selection, by the biometric smart card, of the secure mechanism to be used to validate the transaction may take into account one or more parameters specific to the terminal or to the transaction server. The biometric smart card may receive, for example, these parameters in a command that it has previously received therefrom during step 300. In the case of an EMV type bank transaction, the options supported by the terminal are generally sent to the card in the command called GPO (Get Processing Option).

As previously described, the selection, by the biometric smart card, of the secure mechanism to be used to validate the transaction, may also take into account one or more elements inside the biometric smart card, such as the maximum authorised number of templates NTmax and the maximum authorised number of biometric data items per template NImax.

Thus, the biometric smart card may request that the transaction is validated by a PIN code, for example, if the number of validated templates has not reached the authorised maximum NTmax and if the number of reference biometric data items recorded in a non-validated template has not reached the authorised maximum NImax. The biometric smart card thus requires the use of a PIN code to validate the ongoing transaction and to thus be able to record a new biometric data item as a reference biometric data item.

The biometric smart card may also request that the transaction is validated by a biometric feature if the number of validated templates has not reached the authorised maximum NTmax and if the number of reference biometric data items recorded in a template has reached the authorised maximum NImax during the preceding transaction. The biometric smart card may thus use the verification of the match between the acquired biometric data item and the reference biometric data items recorded in this template to validate both this template and the transaction.

In such a mode of implementation, or in the alternative described hereafter, the method shown in FIG. 3 would not contain steps 350 and 355. After step 345, the method would proceed directly with the continuation of the EMV transaction (step 310). Steps 350 and 355 would only be executed if the transaction validation mode uses the reference biometric data items instead of the personal secret code, with step 350 being executed following step 300 and step 310 being executed following step 350 or step 355. Furthermore, the verification of the biometric feature (the same biometric feature as that verified to validate the template) to authorise the EMV transaction may be processed in step 300 and/or 310 of the transaction.

Alternatively, the biometric smart card could request that the transaction is validated by a biometric feature if a reference biometric data item was recorded during the preceding transaction. This alternative is particularly well suited to the case in which each template may only contain a single reference biometric data item (several templates may then correspond to the same fingerprint), and would thus allow the verification of a match between the acquired biometric data item and the reference biometric data item recorded during the preceding transaction to be used to validate both the corresponding template and the transaction.

Advantageously, a method according to the first embodiment allows the reference biometric data item to be recorded in a transparent manner using the personal secret code of the user. Indeed, the user may do so at the time of a transaction and therefore does not have to visit a different location or use an ad hoc configuration device to configure the biometric feature of his/her card.

Figure 4:
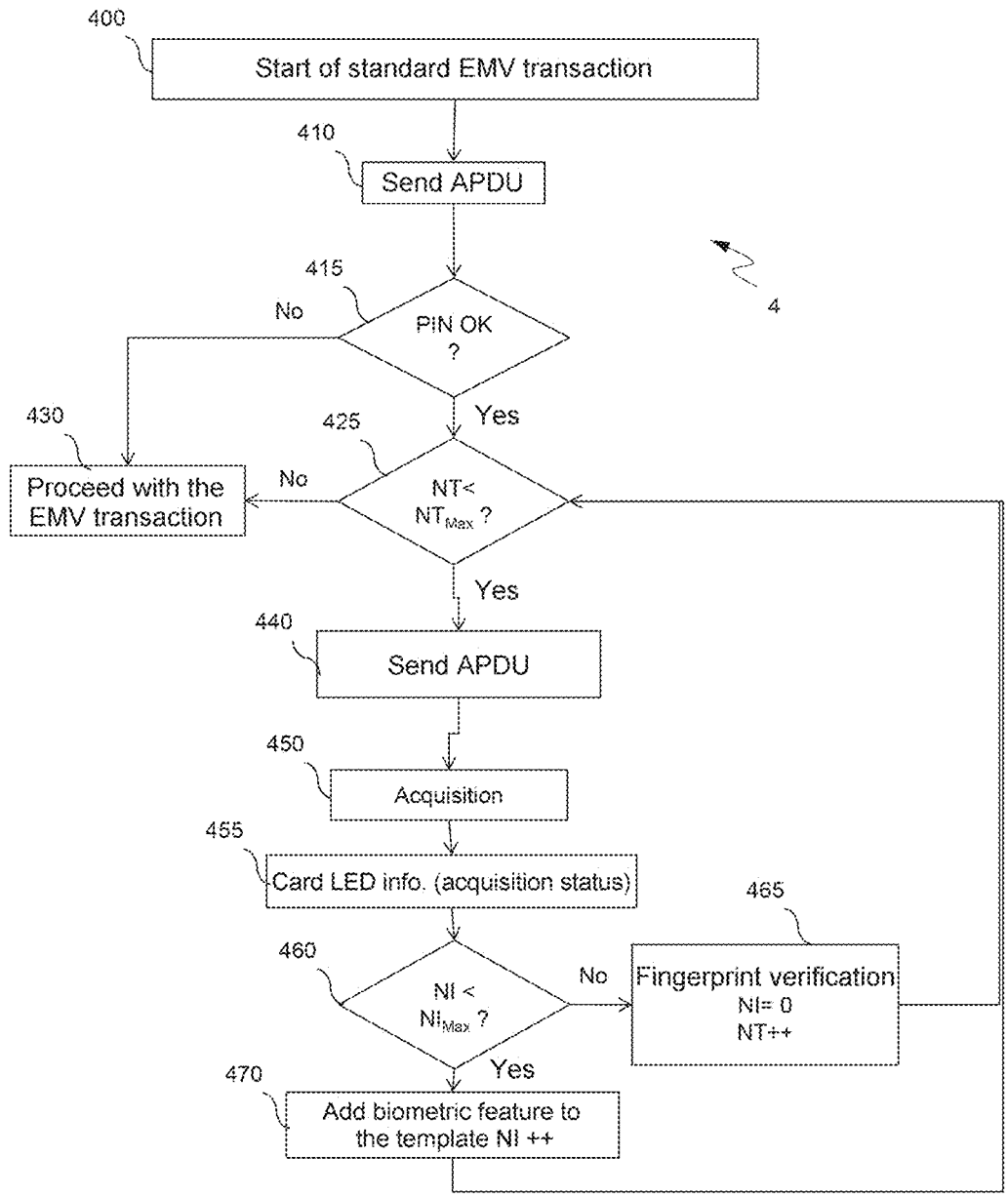
FIG. 4 shows, in the form of a flow chart, steps of a recording method according to a second embodiment of the invention.

FIG. 4 shows, in the form of a flow chart, steps of a recording method 4 according to a second embodiment of the invention.

According to this second embodiment, the biometric smart card 1 is configured to send a command to the external device to display an indication relating to the recording of the biometric data. The external device then displays indications for assisting the user in the configuration of his/her biometric smart card by recording a reference biometric data item.

In this example, several reference biometric data items are recorded in templates, until the maximum number of data items (NImax) in each template is reached and until all the templates are complete (NTmax).

Alternatively, the biometric smart card could acquire and record the maximum authorised number of reference biometric data items NImax for a template during a transaction.

A first step 400 corresponds to the start of a standard EMV transaction with an external device (payment terminal, for example).

During a step 410, the biometric smart card 1 sends an APDU frame compliant with standard ISO 7816 to the external device to request that it displays an indication by which a personal secret code, in this case a PIN code, is requested. During a step 415, the biometric smart card 1 verifies the PIN code entered on the external device to authorise the transaction after the indication is displayed.

If the PIN code is incorrect, the method continues to the step 430 of proceeding with the EMV transaction. In this case, the biometric data will not be recorded. A PIN code attempts counter may be incremented so that the card is blocked (i.e. may no longer be used) if a maximum number of attempts is reached.

If the PIN code is valid, the method proceeds to step 425. The verification of the PIN code (the same PIN code as that verified to record the biometric data item) to authorise the EMV transaction is processed independently in step 400 and/or 430 of the transaction.

Alternatively, the verification of the PIN code to authorise recording of the acquired biometric data item (step 415) also could directly authorise the transaction.

Thus, the PIN code entered by the user on the external device may be verified one or more times during one or more steps.

Step 425 involves determining whether the number of templates NT recorded in the card is less than the predetermined maximum NTmax. If this is not the case, this means that this maximum has already been reached and that it is not possible to record a new biometric data item as a new reference biometric data item, the method then proceeds to step 430.

Otherwise, the biometric smart card sends an APDU frame to the external device to request that it displays an indication asking the user to present a finger on the fingerprint reader (step 440). For example, the indication may request the presentation of a particular finger in order to complete an existing template or simply the presentation of one finger to create a new template.

In step 450, the fingerprint sensor acquires information relating to the fingerprint of the presented finger. For example, the fingerprint sensor takes a photo or an image of the fingerprint or analyses this fingerprint in order to extract the patterns therefrom.

In step 455, an LED present on the smart card changes colour (for example, changes from red to green) to indicate the end of the acquisition.

During a step 460, the card tests whether the maximum number of biometric data items of the template has been reached.

If so, the biometric data items are verified (step 465). Verification of the biometric data items involves verifying the match between the biometric data acquired in step 450 and the reference biometric data items recorded in the template. If the biometric data acquired in step 450 corresponds to the reference biometric data items recorded in the template, the template is validated, the template counter NT is incremented and the number of biometric data items NI is reset to zero (step 465).

Otherwise, during a step 470, the acquired biometric data item is added to the template and the number of biometric data items NI in the template is incremented.

Subsequently, the method continues directly with step 430. This second embodiment allows the user to be supported when configuring his/her card at the time of a transaction. He/she therefore do not need to visit the bank or to use a specific device to this end.

The previous examples are only embodiments of the invention, which is not limited thereby. In particular, features of the first and second embodiments may be combined.

The invention claimed is:

1. A method for recording a reference biometric data item in a biometric smart card including a biometric sensor, the method comprising:
- completing recording a biometric data item acquired by the biometric sensor, as the reference biometric data item, in response to validating, by the biometric smart card, a personal secret code of a biometric smart card user entered on a first external device to authorize a transaction between the biometric smart card and a second external device by the first external device;
- modifying a secure transaction mechanism so that the reference biometric data item is used instead of the personal secret code to authorize a future transaction; and
- cancelling the modifying the secure transaction mechanism upon detection of a predetermined event or in a random manner, so that the personal secret code is again used to authorize a transaction.

2. The method according to claim 1, wherein acquiring of the biometric data item by the biometric sensor is completed when the biometric smart card is powered-on or when the transaction is initiated or in response to validation of the personal secret code by the smart card.

3. The method according to claim 1, wherein the personal secret code is a PIN code.

4. The method according to claim 1, further comprising sending, to the first external device, a command to display an indication relating to the recording of the biometric data item.

5. The method according to claim 1, wherein a plurality of reference biometric data items is recorded in the biometric smart card, the modifying the secure mechanism being completed when the number of recorded reference biometric data items exceeds a predetermined threshold.

6. The method according to claim 1, wherein the predetermined event involves reaching a predefined maximum number of transactions completed by the biometric smart card.

7. The method according to claim 1, wherein the recording the biometric data item as the reference biometric data item includes associating validity information with the reference biometric data item, the predetermined event being determining an invalidity of the reference biometric data item as a function of the associated validity information.

8. The method according to claim 7, wherein the validity information defines one or more of a validity duration of the reference biometric data item, an expiry date of the reference biometric data item, and a maximum number of uses of the reference biometric data item for validating a transaction.

9. The method according to claim 1, wherein the first external device is the second external device.

10. A biometric smart card comprising:
- a biometric sensor configured to acquire a biometric data item of a user of the biometric smart card;
- a memory configured to store said acquired biometric data item;
- a microcontroller configured to store said acquired biometric data item; and
- an interface configured to communicate with a first external device,
- wherein the biometric data item acquired by the biometric sensor is recorded in the memory of the biometric smart card as a reference biometric data item depending on the validation, by the biometric smart card, of a personal secret code of the biometric smart card user entered on the first external device to authorize a transaction between the biometric smart card and a second external device by the first external device,
- a secure transaction mechanism is modified so that the reference biometric data item is used instead of the personal secret code to authorize a future transaction, the modifying the secure transaction mechanism being cancelled upon detection of a predetermined event or in a random manner, so that the personal secret code is again used to authorize a transaction.

11. The biometric smart card according to claim 10, wherein the communication interface is a contact communication interface compliant with standard ISO 7816 or a contactless communication interface compliant with standard ISO 14443 and/or ISO 15693.

12. The biometric smart card according to claim 10, wherein the biometric data item characterizes one of a fingerprint, an iris, a face, and an electrocardiogram.

13. The method according to claim 2, wherein the personal secret code is a PIN code.

14. The method according to claim 2, further comprising sending, to the first external device, a command to display an indication relating to the recording of the biometric data item.

15. The method according to claim 3, further comprising sending, to the first external device, a command to display an indication relating to the recording of the biometric data item.

* * * * *